No. 686,886. Patented Nov. 19, 1901.
R. N. CHAMBERLAIN.
SEPARATOR FOR STORAGE BATTERIES.
(Application filed Sept. 21, 1900.)
(No Model.)

Witnesses:
F. F. Schzinger
Henry L. Deck

R. N. Chamberlain Inventor.
By Wilhelm Bonner
Attorneys.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y., A CORPORATION OF WEST VIRGINIA.

SEPARATOR FOR STORAGE BATTERIES.

SPECIFICATION forming part of Letters Patent No. 686,886, dated November 19, 1901.

Application filed September 21, 1900. Serial No. 30,689. (No model.)

*To all whom it may concern:*

Be it known that I, RUFUS N. CHAMBERLAIN, a citizen of the United States, residing at Depew, in the county of Erie and State of New York, have invented new and useful Improvements in Separators for Storage Batteries, of which the following is a specification.

This invention relates to the separators employed in storage batteries for insulating adjacent electrodes or plates of different polarity from each other.

The object of my invention is the provision of a separator of this kind which can be cheaply produced, which reliably and effectively insulates the battery-plates and at the same time permits a free circulation of the acid solution or electrolyte among the plates, and which covers the active material and the ribs, leaves, or partitions of the plates as little as possible, so as to obtain the greatest possible capacity and efficiency of the plates.

Figure 1:
Figure 2:
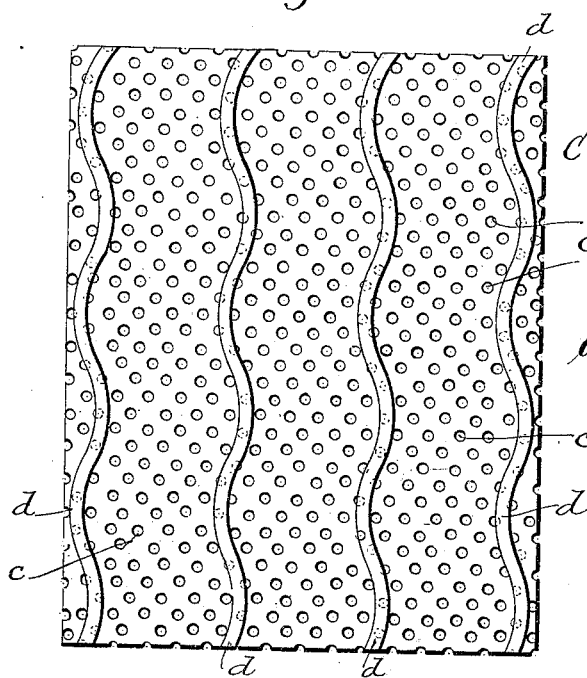
Figure 4:
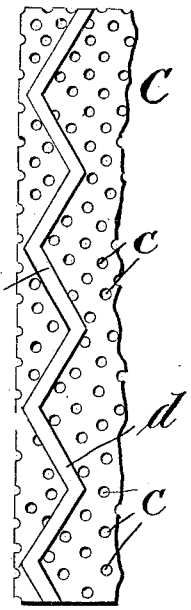
Figure 3:

In the accompanying drawings, Figure 1 is a top plan view of a storage battery provided with my improved separators. Fig. 2 is a face view of one of the separators provided with ribs having a wavy form. Fig. 3 is a horizontal section thereof. Fig. 4 is a fragmentary face view showing a separator provided with ribs having a zigzag form.

Like letters of reference refer to like parts in the several figures.

A is the case of the battery, and B the electrodes or battery-plates, provided on opposite sides with the usual leaves, ribs, or partitions forming grooves for the customary filling of active material.

C represents my improved separators arranged between adjacent battery-plates. Each of these separators consists of a thin plate of hard rubber or other suitable insulating and acid-proof material, which plate extends from side to side of the battery-case and is provided over its entire surface with perforations *c*, forming passages through which the acid solution or electrolyte circulates. The separator is provided on both sides with raised ribs *d*, which preferably extend from top to bottom thereof and which bear against the surfaces of the plates on opposite sides of the separator, so as to prevent the perforated body of the separator from coming in contact with the plates and interfering with the circulation of the electrolyte. The ribs *d* preferably consist of solid strips of hard rubber, which are cemented to opposite sides of the separator-plate and which are half round in cross-section, with their convex sides facing outwardly, as shown in Fig. 3, so as to present a comparatively small contact-surface to the contiguous battery-plates. By forming the solid ribs separate from the separator-plate and connecting the same thereto the separator can be produced at comparatively small cost. The ribs of the separator are not straight, but have a wavy form, as shown in Fig. 2, or a zigzag form, as shown in Fig. 4, so that successive parts of the same rib stand in different directions, or, in other words, each rib has a series of short sharp turns from one side to the other in succession, whereby the ribs do not entirely cover any of the leaves or strips of active material of the battery-plates, but intersect or cover them only at intervals, thereby allowing the acid or electrolyte to come in contact with the same at various points and obtaining a maximum capacity and efficiency of the battery-plates. These ribs are arranged along the outer edges of the perforated sheet and intermediate of the outer edges. The ribs on opposite sides of the separator preferably register or are arranged in line with each other, as shown in Fig. 3. This construction renders the ribs stiff and firm and prevents the same from bending or flattening out under pressure when the separator becomes slightly heated from the heat of the electrolyte.

As my improved separator is provided on each side with raised ribs, which remain intact under all conditions, the perforated body of the separator is reliably held out of contact with the battery-plates, on opposite sides thereof, thus effectively insulating the plates and permitting an unobstructed circulation of the electrolyte.

I claim as my invention—

1. A separator for the electrodes of storage batteries, consisting of a perforated plate of insulating material provided with raised ribs having a series of short sharp turns from one side to the other in succession, substantially as set forth.

2. A separator for the electrodes of storage batteries, consisting of a perforated plate of insulating material provided on both sides with raised ribs having a wavy form, substantially as set forth.

Witness my hand this 12th day of September, 1900.

RUFUS N. CHAMBERLAIN.

Witnesses:
   CARL F. GEYER,
   JNO. J. BONNER.